US012767875B2

(12) United States Patent
Ahmady et al.

(10) Patent No.: US 12,767,875 B2
(45) Date of Patent: Oct. 20, 2026

(54) CEMENTING COMPOSITIONS FOR PLUGGING VERY LARGE FRACTURE WIDTHS

(71) Applicant: Halliburton Energy Services, Inc., Houston, TX (US)

(72) Inventors: Afshin Ahmady, Houston, TX (US); Ronnie Glen Morgan, Duncan, OK (US); Kyriacos Agapiou, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/742,866

(22) Filed: Jun. 13, 2024

(65) Prior Publication Data

US 2025/0382515 A1 Dec. 18, 2025

(51) Int. Cl.

| | |
|---|---|
| ***C09K 8/487*** | (2006.01) |
| ***C04B 14/28*** | (2006.01) |
| ***C04B 16/02*** | (2006.01) |
| ***C04B 28/02*** | (2006.01) |
| ***C09K 8/42*** | (2006.01) |
| ***E21B 21/00*** | (2006.01) |
| ***E21B 33/138*** | (2006.01) |

(52) U.S. Cl.

CPC .............. *C09K 8/487* (2013.01); *C04B 14/28* (2013.01); *C04B 16/02* (2013.01); *C04B 28/02* (2013.01); *C09K 8/424* (2013.01); *E21B 21/003* (2013.01); *E21B 33/138* (2013.01)

(58) Field of Classification Search

CPC ..... E21B 21/003; E21B 33/138; C09K 8/487; C09K 8/424; C04B 14/28; C04B 16/02; C04B 28/02

See application file for complete search history.

(56) References Cited

U.S. PATENT DOCUMENTS

| | | | |
|---|---|---|---|
| 10,144,860 B1 | 12/2018 | Reddy | |
| 10,160,900 B2 | 12/2018 | Morgan et al. | |
| 11,225,596 B2 | 1/2022 | Patil et al. | |
| 11,365,341 B2 | 6/2022 | Patil et al. | |
| 11,624,020 B1 * | 4/2023 | Alanqari ............... | C04B 24/281 166/295 |
| 11,807,806 B2 | 11/2023 | Patil et al. | |

(Continued)

OTHER PUBLICATIONS

International Search Report and Written Opinion for International Patent Application No. PCT/US2024/035179 dated Mar. 10, 2025. PDF file. 10 pages.

*Primary Examiner* — Yanick A Akaragwe
(74) *Attorney, Agent, or Firm* — Thomas Rooney; C. Tumey Law Group PLLC

(57) ABSTRACT

A method of sealing a lost circulation zone may include: circulating a lost circulation treatment composition to a subterranean formation comprising a lost circulation zone, wherein the lost circulation treatment composition comprises: a carrier fluid; a polymeric additive; a fine particulate component; and a composite particulate component containing size and shape selected materials; wherein the cost circulation treatment composition has the property of allowing full volume passage through a 15,000 micron fracture width; flowing the lost circulation treatment composition into the lost circulation zone; and plugging the lost circulation zone using the lost circulation treatment composition.

12 Claims, 3 Drawing Sheets

(56) References Cited

U.S. PATENT DOCUMENTS

| | | | | |
|---|---|---|---|---|
| 11,879,089 | B1 | 1/2024 | Devarapalli et al. | |
| 2013/0143777 | A1 | 6/2013 | Wang | |
| 2013/0284518 | A1* | 10/2013 | Wu | C09K 8/035 175/65 |
| 2015/0292278 | A1* | 10/2015 | Wang | C09K 8/467 166/292 |
| 2022/0010192 | A1 | 1/2022 | Lewis et al. | |
| 2022/0127512 | A1* | 4/2022 | Amanullah | C04B 38/009 |
| 2023/0193705 | A1 | 6/2023 | Ramasamy et al. | |
| 2023/0340841 | A1 | 10/2023 | Singh et al. | |
| 2024/0392179 | A1* | 11/2024 | Dahi Taleghani | E21B 33/138 |

* cited by examiner

CEMENTING COMPOSITIONS FOR PLUGGING VERY LARGE FRACTURE WIDTHS

BACKGROUND

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string functions to prevent the migration of fluids in the annulus, as well as protect the pipe string from corrosion. Cement compositions also may be used in remedial cementing methods, for example, to seal cracks or holes in pipe strings or cement sheaths, to seal highly permeable formation zones or fractures, to place a cement plug, and the like.

Drilling requires the use of drilling fluid or as it is also known, drilling mud. One problem associated with drilling may be the undesirable loss of drilling fluid to the formation. Such lost fluids typically may go into, for example, fractures induced by excessive mud pressures, into pre-existing open fractures, or into large openings with structural strength in the formation. This problem may be referred to as "lost circulation," and the sections of the formation into which the drilling fluid may be lost may be referred to as "lost circulation zones." In addition to drilling fluids, problems with lost circulation may also be encountered with other treatment fluids, for example, spacer fluids, completion fluids (e.g., completion brines), fracturing fluids, and cement compositions that may be introduced into a well bore.

The loss of treatment fluids into the formation is undesirable, inter alia, because of the expense associated with the treatment fluid lost into the formation, loss of time, in extreme conditions, well abandonment. Treatment fluid replacement does not just create operation downtime, but may also require additional fluid storage, additional manpower, and additional equipment. In addition to the increased operating expenses, fluid replacement may create additional worksite problems such as higher environmental burdens and the inability to recycle fluids and materials once their respective portion of the operation has been completed.

BRIEF DESCRIPTION OF THE DRAWINGS

These drawings illustrate certain aspects of some of the embodiments of the present method, and should not be used to limit or define the method.

DETAILED DESCRIPTION

Figure 1:
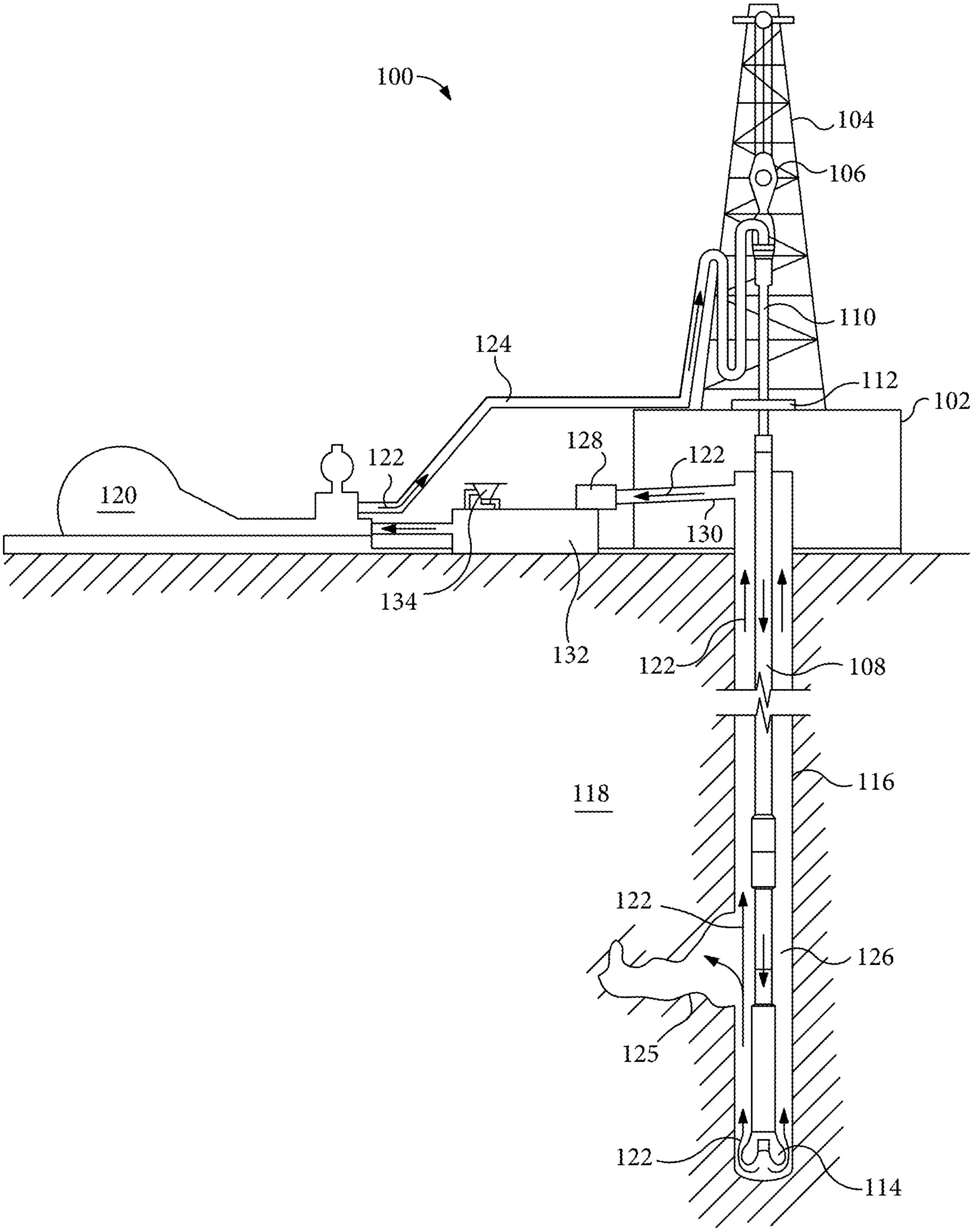
FIG. 1 illustrates a system for using a lost circulation compositions while drilling equipment is present in a wellbore in accordance with certain embodiments.

The present embodiments relate to subterranean operations and, more particularly, in certain embodiments, to lost-circulation compositions comprising a carrier fluid, a polymeric additive, a fine particulate component, and a composite particulate component containing size and shape selected materials.

Controlling lost circulation of fluids through large to very large loss zones such as those loss zones which have fracture widths of 5000 micron or greater presents challenges to wellbore servicing operators. Zones having fracture widths of 5000 micron or greater may not be adequately sealed with use of lost circulation material alone. When large loss zones are encountered, operators may try to seal the large loss zones by utilizing fluids containing reactive gunks, cements, foamed cements, specialized cements with immediate, "right-angle" setting behavior, or thixotopically engineered fluids. However, while these fluids may be effective in sealing the large loss zones, there exist challenges with preparing and placing such fluids. For example, large loss zones often require a high loading of lost circulation material which may present challenges to mixing the lost circulation fluid and the lost circulation material may not be well dispersed within the carrier fluid. Additionally, lost circulation fluids with a high loading of lost circulation material may plug downhole equipment before the lost circulation fluid can be placed into a large loss zone such as when there is a reduction in cross sectional area which the lost circulation fluid flows through. The undesirable plugging of downhole equipment may jeopardize further fluid placement.

The lost-circulation compositions disclosed herein addresses the aforementioned challenges of controlling fluid losses through large to very large fracture widths of at least 5000 microns. As will be discussed below, the lost-circulation compositions disclosed herein may plug fracture widths up to 10000 micron, while allowing full volume passage through 15000 micron fracture widths. Accordingly, the lost-circulation compositions may be utilized in high loss rate applications with reduced risk of plugging off equipment clearances and critical flow path dimensions.

In embodiments, the lost-circulation compositions include a cement slurry base fluid. In general, cement slurry base fluids include a hydraulic cement and water. A variety of hydraulic cements may be utilized in accordance with the present disclosure, including, but not limited to, those comprising calcium, aluminum, silicon, oxygen, iron, and/or sulfur, which set and harden by reaction with water. Suitable hydraulic cements may include, but are not limited to, Portland cements, pozzolana cements, gypsum cements, high alumina content cements, silica cements, and any combination thereof. In certain examples, the hydraulic cement may include a Portland cement. In some examples, the Portland cements may include Portland cements that are classified as Classes A, C, H, and G cements according to American Petroleum Institute, *API Specification for Materials and Testing for Well Cements*, API Specification 10, Fifth Ed., Jul. 1, 1990. In addition, hydraulic cements may include cements classified by American Society for Testing and Materials (ASTM) in C150 (Standard Specification for Portland Cement), C595 (Standard Specification for Blended Hydraulic Cement) or C1157 (Performance Specification for Hydraulic Cements) such as those cements classified as ASTM Type I, II, or III. The hydraulic cement may be included in the cement slurry base fluid in any amount suitable for a particular composition. Without limitation, the hydraulic cement may be included in the cement slurry base fluids in an amount in the range of from about 10% to about 80% by weight of dry blend in the cement slurry base fluid. For example, the hydraulic cement may be present in an amount ranging between any of and/or including any of about 10%, about 15%, about 20%, about 25%, about 30%, about 35%, about 40%, about 45%, about 50%, about 55%, about 60%, about 65%, about 70%, about 75%, or about 80% by weight of the cement slurry base fluid.

The water may be from any source provided that it does not contain an excess of compounds that may undesirably affect other components in the cement slurry base fluid. For example, a cement slurry base fluid may include fresh water or saltwater. Saltwater generally may include one or more dissolved salts therein and may be saturated or unsaturated as desired for a particular application. Seawater or brines may be suitable for use in some examples. Further, the water may be present in an amount sufficient to form a pumpable slurry. In certain examples, the water may be present in the cement slurry base fluid in an amount in the range of from about 33% to about 200% by weight of the cementitious materials. For example, the water cement may be present in an amount ranging between any of and/or including any of about 33%, about 50%, about 75%, about 100%, about 125%, about 150%, about 175%, or about 200% by weight of the cementitious materials. The cementitious materials referenced may include all components which contribute to the compressive strength of the cement slurry base fluid such as the hydraulic cement and supplementary cementitious materials, for example.

As mentioned above, the cement slurry base fluid may include supplementary cementitious materials. The supplementary cementitious material may be any material that contributes to the desired properties of the cement slurry base fluid. Some supplementary cementitious materials may include, without limitation, fly ash, blast furnace slag, silica fume, pozzolans, kiln dust, and clays, for example.

The cement slurry base fluid may include kiln dust as a supplementary cementitious material. "Kiln dust," as that term is used herein, refers to a solid material generated as a by-product of the heating of certain materials in kilns. The term "kiln dust" as used herein is intended to include kiln dust made as described herein and equivalent forms of kiln dust. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. The chemical analysis of the cement kiln dust from various cement manufactures varies depending on a number of factors, including the particular kiln feed, the efficiencies of the cement production operation, and the associated dust collection systems. Cement kiln dust generally may include a variety of oxides, such as $SiO_2$, $Al_2O_3$, $Fe_2O_3$, CaO, MgO, $SO_3$, $Na_2O$, and $K_2O$. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include varying amounts of free lime and free magnesium, lime stone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides. Cement kiln dust may include a partially calcined kiln feed which is removed from the gas stream and collected in a dust collector during the manufacture of cement. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$. The CKD and/or lime kiln dust may be included in examples of the cement slurry base fluid in an amount suitable for a particular application.

In some examples, the cement slurry base fluid may further include one or more of slag, natural glass, shale, amorphous silica, or metakaolin as a supplementary cementitious material. Slag is generally a granulated, blast furnace by-product from the production of cast iron including the oxidized impurities found in iron ore. The cement may further include shale. A variety of shales may be suitable, including those including silicon, aluminum, calcium, and/or magnesium. Examples of suitable shales include vitrified shale and/or calcined shale. In some examples, the cement slurry base fluid may further include amorphous silica as a supplementary cementitious material. Amorphous silica is a powder that may be included in embodiments to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process In some examples, the cement slurry base fluid may further include a variety of fly ashes as a supplementary cementitious material which may include fly ash classified as Class C, Class F, or Class N fly ash according to American Petroleum Institute, API Specification for Materials and Testing for Well Cements, API Specification 10, Fifth Ed., Jul. 1, 1990. In some examples, the cement slurry base fluid may further include zeolites as supplementary cementitious materials. Zeolites are generally porous alumino-silicate minerals that may be either natural or synthetic. Synthetic zeolites are based on the same type of structural cell as natural zeolites and may comprise aluminosilicate hydrates. As used herein, the term "zeolite" refers to all natural and synthetic forms of zeolite.

Where used, one or more of the aforementioned supplementary cementitious materials may be present in the cement slurry base fluid. For example, without limitation, one or more supplementary cementitious materials may be present in an amount of about 0.1% to about 80% by weight of the cement slurry base fluid. For example, the supplementary cementitious materials may be present in an amount ranging between any of and/or including any of about 0.1%, about 10%, about 20%, about 30%, about 40%, about 50%, about 60%, about 70%, or about 80% by weight of the cement.

In some examples, the cement slurry base fluid may further include hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in examples of the cement slurry base fluid, for example, to form a hydraulic composition with the supplementary cementitious components. For example, the hydrated lime may be included in a supplementary cementitious material-to-hydrated-lime weight ratio of about 10:1 to about 1:1 or 3:1 to about 5:1. Where present, the hydrated lime may be included in the set cement slurry base fluid in an amount in the range of from about 10% to about 100% by weight of the cement slurry base fluid, for example. In some examples, the hydrated lime may be present in an amount ranging between any of and/or including any of about 10%, about 20%, about 40%, about 60%, about 80%, or about 100% by weight of the cement slurry base fluid. In some examples, the cementitious components present in the cement slurry base fluid may consist essentially of one or more supplementary cementitious materials and the hydrated lime. For example, the cementitious components may primarily comprise the supplementary cementitious materials and the hydrated lime without any additional components (e.g., Portland cement, fly ash, slag cement) that hydraulically set in the presence of water.

Lime may be present in the cement slurry base fluid in several; forms, including as calcium oxide and or calcium hydroxide or as a reaction product such as when Portland cement reacts with water. Alternatively, lime may be included in the cement slurry base fluid by amount of silica in the cement slurry base fluid. A cement slurry base fluid may be designed to have a target lime to silica weight ratio. The target lime to silica ratio may be a molar ratio, molal ratio, or any other equivalent way of expressing a relative amount of silica to lime. Any suitable target time to silica weight ratio may be selected including from about 10/90 lime to silica by weight to about 40/60 lime to silica by weight. Alternatively, about 10/90 lime to silica by weight to about 20/80 lime to silica by weight, about 20/80 lime to silica by weight to about 30/70 lime to silica by weight, or about 30/70 lime to silica by weight to about 40/63 lime to silica by weight.

Other additives suitable for use in subterranean cementing operations also may be included in embodiments of the cement slurry base fluid. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the cement slurry base fluid after storing but prior to the placement of a cement slurry base fluid into a subterranean formation. In some examples, the cement slurry base fluid may further include a dispersant. Examples of suitable dispersants include, without limitation, sulfonated-formaldehyde-based dispersants (e.g., sulfonated acetone formaldehyde condensate) or polycarboxylated ether dispersants. In some examples, the dispersant may be included in the cement slurry base fluid in an amount in the range of from about 0.01% to about 5% by weight of the cementitious materials. In specific examples, the dispersant may be present in an amount ranging between any of and/or including any of about 0.01%, about 0.1%, about 0.5%, about 1%, about 2%, about 3%, about 4%, or about 5% by weight of the cementitious materials.

In some examples, the cement slurry base fluid may further include a set retarder. A broad variety of set retarders may be suitable for use in the cement slurry base fluid. For example, the set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. Generally, the set retarder may be present in the cement slurry base fluid in an amount sufficient to delay the setting for a desired time. In some examples, the set retarder may be present in the cement slurry base fluid in an amount in the range of from about 0.01% to about 10% by weight of the cementitious materials. In specific examples, the set retarder may be present in an amount ranging between any of and/or including any of about 0.01%, about 0.1%, about 1%, about 2%, about 4%, about 6%, about 8%, or about 10% by weight of the cementitious materials.

In some examples, the cement slurry base fluid may further include an accelerator. A broad variety of accelerators may be suitable for use in the cement slurry base fluid. For example, the accelerator may include, but are not limited to, aluminum sulfate, alums, calcium chloride, calcium nitrate, calcium nitrite, calcium formate, calcium sulphoaluminate, calcium sulfate, gypsum-hemihydrate, sodium aluminate, sodium carbonate, sodium chloride, sodium silicate, sodium sulfate, ferric chloride, or a combination thereof. In some examples, the accelerators may be present in the cement slurry base fluid in an amount in the range of from about 0.01% to about 10% by weight of the cementitious materials. In specific examples, the accelerators may be present in an amount ranging between any of and/or including any of about 0.01%, about 0.1%, about 1%, about 2%, about 4%, about 6%, about 8%, or about 10% by weight of the cementitious materials.

In embodiments, the lost-circulation compositions include a spacer base fluid. In general, a spacer base fluid includes a fluid having sufficient rheological properties to displace another fluid, such as a drilling fluid, in a wellbore. In embodiments, the spacer base fluid can include an aqueous based fluid, a colloid, an emulsion, or an invert emulsion. The spacer base fluid can include dissolved materials or undissolved solids. The spacer base fluid can include water. The water can be selected from the group consisting of freshwater, seawater, brine, and any combination thereof in any proportion. The treatment fluid can further include a water-soluble salt. The water-soluble salt can be selected from the group consisting of sodium chloride, calcium chloride, calcium bromide, potassium chloride, potassium bromide, magnesium chloride, and any combination thereof. The treatment fluid can contain the water-soluble salt in a concentration in the range of about 5 to about 350 pounds per barrel (ppb) (19 to 1,353 kilograms per cubic meter "$kg/m^3$") of the water.

In embodiments, the lost-circulation compositions include a polymeric additive. The polymeric additive may include a polymer or copolymer formed from the co-polymerization of one or more ethylene polar monomers and/or one or more ethylene ester monomers. The ethylene polar monomers may be ethylenically saturated or unsaturated polar monomers. The ethylene ester monomers may be saturated or unsaturated ester monomers. The cross-linkable copolymer may be a block or non-block copolymer, including a random copolymer or a graft copolymer.

In embodiments, ethylenically unsaturated polar monomers include monomers where the unsaturated group is vinyl or alpha methyl vinyl. In further embodiments, the ethylenically unsaturated polar monomers are derived from an unsaturated carboxylic acid such as a primary, secondary or tertiary amide thereof. The amide may be derived from ammonia and/or a C1 to C10 primary alkylamine or a C1 to C10 secondary alkylamine. In embodiments the amine is substituted by at least one hydroxyl group to form an ethanolamide. Some examples of suitable ethylenically unsaturated polar monomers include, without limitation, acrylamide, methacrylamide, acrylic ethanol amide, a vinyl heterocyclic compound with at least O, S or N atom in a ring with 3 to 8 carbon atoms, such as N-vinyl-pyrrolidone, -caprolactam, and vinyl pyridine. In embodiments, the cross-linkable copolymer includes the ethylenically unsaturated polar monomer in an amount at a point in a range of from 1 mol. % to 90 mol. %. Alternatively, in an amount at a point in a range of from 1 mol. % to 25 mol. %, in an amount at a point in a range of from 25 mol. % to 50 mol. %, in an amount at a point in a range of from 50 mol. % to 90 mol. %, or in an amount at a point in a range of any subranges therebetween.

In embodiments, the ethylenically unsaturated ester monomers include monomers derived from a hydroxyl compound and an ethylenically unsaturated carboxylic acid. The ethylenically unsaturated group on the carboxylic acid may be in the alpha-beta or beta-gamma position relative to the carboxyl group. In embodiments, the carboxylic acid includes 3-20 carbon atoms. In embodiments the carboxylic acid includes alkenoic and aralkenoic acids with 3 to 6 or 9 to 12 carbon atoms. Examples of suitable acids include, but are not limited to, acrylic, methacrylic. Crotonic, and cinnamic acids. In embodiments, the hydroxyl compound includes an alcohol and may be of formula ROH. where R is a C1 to C30 hydrocarbyl group. In embodiments the hydrocarbyl group includes C1-C30 alkyl groups, C2-C20 alkenyl groups, C5-C8 cycloalkyl, aryl groups such as aromatic hydrocarbyl groups having 6 to 20 carbon atoms, and aralkyl groups of 7 to 24 carbon atoms. Specific examples of R groups include methyl, ethyl, propyl, butyl, amyl, hexyl, octyl, 2-ethylhexyl and decyl, allyl, cyclohexyl, palmityl, stearyl, phenyl and benzyl. The R group may also be a hydrocarbyl group substituted by at least one of hydroxyl, ether, or thio ether groups. The hydroxyl compound may be a primary, secondary, iso or tertiary compound, such as a tertiary carbon atom bonded to the hydroxyl group including tert-butyl and trityl. The R group may also comprise a heterocyclic group either for bonding directly to the hydroxyl group of ROH or separated therefrom by an alkylene group such as by 1 to 4 carbon atoms. Thus, the R group may be a saturated or unsaturated heterocyclic or heterocyclic alkylene group including 3 to 8 carbon atoms and at least one or two ring heteroatoms selected from O, N and S. Examples of such groups are furyl, tetrahydrofuryl, furfuryl and tetrahydrofurfuryl, pyranyl and tetrahydropyranyl. In embodiments, the R groups are selected from tert-butyl, trityl, methoxymethyl, benzyloxymethyl and tetrahydropyranyl, stearyl, isopropyl, ethyl and methyl. In embodiments, the ester is t-butyl ester. In further embodiments, the ethylenically unsaturated ester may also be derived from a hydroxyl compound of formula ROH and an ethylenically unsaturated sulphonic or C2-C20 phosphoric acid. In embodiments the phosphoric acid includes alkenyl acids such as vinyl sulphonic acid and vinyl phosphonic acid. In embodiments the ester may be methyl or ethyl vinyl sulphonate or phosphonate. In embodiments the ester may be derived from an acid containing an ethylenically unsaturated carboxamide such as an acrylamido group. In embodiments, the cross-linkable copolymer includes the ethylenically unsaturated ester monomers in an amount at a point in a range of from 1 mol. % to 50 mol. %. Alternatively, in an amount at a point in a range of from 1 mol. % to 15 mol. %, in an amount at a point in a range of from 15 mol. % to 35 mol. %, in an amount at a point in a range of from 35 mol. % to 50 mol. %, or in an amount at a point in a range of any subranges therebetween.

In embodiments the lost-circulation compositions include a polymeric additive which include, but are not limited to, a polyacrylamide, an acrylamide copolymer, an acrylamide-co-t-butylacrylate copolymer, a 2-acrylamido-2-methylpropane sulfonic acid/acrylamide copolymer, a sulfonated styrene/maleic anhydride copolymer, a vinylpyrrolidone/2-acrylamido-2-methylpropane sulfonic acid/acrylamide terpolymer, a 2-acrylamido-2-methylpropane sulfonic acid/N—N-dimethylacrylamide/acrylamide terpolymer, a polyketone, an acrylamide/t-butyl acrylate copolymer, any derivative thereof, and any combination thereof.

In embodiments, the lost-circulation compositions include the polymeric additive at a point in a range of from 1 vol. % to 25 vol. %. Alternatively, in an amount at a point in a range of from 1 vol. % to 5 vol. %, in an amount at a point in a range of from 5 vol mol. % to 10 vol. %, in an amount at a point in a range of from 10 vol. % to 15 vol. %, in an amount at a point in a range of from 15 vol. % to 25 vol. %, or in an amount at a point in a range of any subranges therebetween.

In embodiments, the lost-circulation compositions include a crosslinker. Under wellbore conditions, the crosslinker may react with one or more cross-linkable copolymers included in the lost-circulation compositions so as to form a gel. In embodiments, the crosslinkers may include, but are not limited to, any metal crosslinkers including chromium, zinc, iron, and any combination thereof. In some embodiments, the crosslinker may include, but are not limited to, an amine-containing polymer, an amine-containing copolymer, and any combination thereof. Suitable examples of crosslinkers for use in the embodiments described herein may include, but are not limited to, a polyalkyleneimine such as polyethyleneimine, a polyalkylenepolyamine, a polyfunctional aliphatic amine, an arylalkylamine, a heteroarylalkylamine, a chitosan, a polylysine, a vinyl alcohol/vinylamine copolymer, a partially hydrolyzed polyvinyl formamide, any derivative thereof, and any combination thereof. As used herein, the term "derivative" refers to any compound that is made from one of the listed compounds by replacing one atom in one of the listed compounds with another atom or group of atoms, ionizing one of the listed compounds, or creating a salt of one of the listed compounds.

In embodiments, the lost-circulation compositions include the crosslinker in an amount at a point in a range of from 0.1 vol. % to 15 vol. %. Alternatively, in an amount at a point in a range of from 0.1 vol. % to 10 vol. %, in an amount at a point in a range of from 0.1 vol. % to 1 vol. %, in a range of from 1 vol mol. % to 5 vol. %, in an amount at a point in a range of from 5 vol. % to 10 vol. %, in an amount at a point in a range of from 10 vol. % to 15 vol. %, or in an amount at a point in a range of any subranges therebetween.

In embodiments, the lost-circulation compositions include an elasticity modifier. In embodiments, the elasticity modifier includes a latex. A latex herein refers to any number of polymeric materials commonly known as a "polymer emulsion," that includes a water emulsion of a rubber or plastic obtained by polymerization. In an embodiment, the latex comprises a naturally-occurring material. Alternatively, the latex comprises a synthetic material. Alternatively, the latex comprises a mixture of a naturally-occurring and a synthetic material. Latexes suitable for use in elastic sealant compositions may be in the form of an emulsion comprising an aqueous medium with liquid or solid polymer particles dispersed therein. In an embodiment, a latex suitable for use in the lost-circulation compositions is in the form of an emulsion comprising about 50% of an aqueous component, alternatively from about 30% to about 70% or alternatively from about 40% to about 60% based on the total weight of the emulsion. In an embodiment, the latex comprises a polymer. In an embodiment, the latex polymer comprises isoprene, styrene, acrylonitrile, butadiene, or combinations thereof. In an embodiment, the latex polymer comprises a styrene copolymer dispersed in water to form an aqueous emulsion. In an embodiment, the weight ratio of the styrene to a co-monomer (e.g., butadiene) is about 1:99, alternatively about 10:90, alternatively about 20:80, alternatively about 30:70, alternatively about 40:60, alternatively about 50:50, alternatively about 60:40, alternatively about 70:30, alternatively about 80:20, alternatively about 90:10, alternatively about 99:1. Alternatively, in an embodiment, the latex comprises 100% styrene. In an embodiment, the latex comprises an alkali swellable latex. Alkali swellable latex includes as a latex emulsion that, when exposed to pH-increasing materials, may swell and exhibit an increase in viscosity. Alkali swellable latexes typically contain, in addition to typical latex-forming monomers, other monomers having acidic groups capable of reacting with pH increasing materials, thereby forming anionic pendant groups on the polymer back bone. Examples of typical latex-forming monomers that may be used to make alkali swellable latexes include, without limitation, vinyl aromatic monomers (e.g., styrene based monomers), ethylene, butadiene, vinylnitrile (e.g., acrylonitrile), olefinically unsaturated esters of $C_1$-$C_8$ alcohol, or combinations thereof. In some embodiments, non-ionic monomers that exhibit steric effects and that contain long ethoxylate or hydrocarbon tails may also be present.

In an embodiment, the latex comprises a cationic latex. In an embodiment, the cationic latexes comprise latex-forming monomers and positively charged monomers. Nonlimiting examples of latex-forming monomers suitable for use in the elastic sealant compositions include vinyl aromatic monomers (e.g., styrene based monomers), ethylene, butadiene, vinylnitrile (e.g., acrylonitrile), olefinically unsaturated esters of $C_1$-$C_8$ alcohols, non-ionic monomers that exhibit steric effects and that contain ethoxylate or hydrocarbon tails, or combinations thereof. In embodiments the latex polymer is synthesized from monomers containing quaternary ammonium groups, trimethylaminopropylmethacrylamide bromide, monomers containing other-onium species, such as trialkylsulfonium or tetraalkylphosphonium structures, protonated tertiary amines, or combinations thereof. In an embodiment, the positively charged monomer comprises dimethylaminomethacrylamide, which when polymerized in an acidic medium become cationic by protonation of amine nitrogen. In an embodiment, the latex may comprise at least one polar monomer and at least one elasticity-enhancing monomer. According to certain embodiments, the latex further comprises at least one stiffness-enhancing monomer. In embodiments the polar monomer may comprise vinylamine, vinyl acetate, acrylonitrile, or acid, ester, amide, or salt forms of acrylates, such as acrylic acid, and the elasticity-enhancing monomer may be selected from ethylene, propylene, butadiene, 1,3-hexadiene or isoprene. In the embodiments that include a stiffness-enhancing monomer, the stiffness-enhancing monomer may comprise styrene, t-butylstyrene, α-methylstyrene, sulfonated styrene or combinations thereof.

In embodiments the fine particulate component includes sized particles suitable for plugging a lost circulation zone. In embodiments the fine particulate component includes cellulose. Cellulose is a complex carbohydrate polymer consisting of oxygen, carbon, and hydrogen. More specifically, cellulose is a polysaccharide composed of a linear chain of β-1,4 linked d-glucose units with a degree of polymerization ranging from several hundred to over ten thousand. Cellulose can be synthetic or naturally derived from plants. In embodiments the fine particulate component includes is sized calcium carbonate. The sized calcium carbonate can be sized ground marble. The sized calcium carbonate can be acid soluble. The sized calcium carbonate can have a median particle size (d50) in the range of 3 to 10 micrometers (microns). The mean particle size corresponds to d50 values as measured by commercially available particle size analyzers such as those manufactured by Malvern Instruments, Worcestershire, United Kingdom. In embodiments the fine particulate component includes fibers. The fibers can be natural fibers or synthetic fibers. The fibers can be finely ground fibrous cellulosic material.

In embodiments the fine particulate component includes particles which have a particle size distribution determined by dry vibratory sieving of a d10 value in the range of 10 to 50 microns, a d50 value in the range of 60 to 150 microns, and a d90 value in the range of 150 to 400 microns. In addition to the aforementioned particle size distributions, the width of the distribution is defined as the ratio of d90/d10. For example, a d90/d10 ratio may include from about 3 to about 40 such a d90/d10 of 150/50, 275/30, and/or 400/10.

The fine particulate component can also have a particle size distribution such that a large percentage of the fine particulate component passes through the fracture to be plugged and subsequently plug the formation faces within the fracture to be plugged. The pore size associated with the fracture faces may be pre-determined, for example by an operator at a specific well site, based in part on the anticipated pore sizes associated with drill cuttings returned to a surface. The pore sizes to be plugged can be in a size range of, for example, API screen size 80 to 120 having a pore size in the range of 125 to 177 microns. According to any of the embodiments, 80% to 100% of the fine particulate component of the lost-circulation composition pass through a screen having a pore size greater than or equal to 105 microns (API 140 mesh); 85% to 100% pass through a screen having a pore size greater than or equal to 149 microns (API 100 mesh); and 90% to 100% pass through a screen having a pore size greater than or equal to 177 microns (API 80 mesh).

In embodiments the composite particulate component contains size and shape selected materials includes sized particles suitable for plugging a lost circulation zone. In embodiments, the composite particulate component is selected such that a first particle component of the composite particulate component includes particles with a d50 particle size measurement of about ⅓ the size of the fracture width to be plugged. In embodiments, a second particle component includes particles with d50 particle size measurement of about ⅕*d50 of the first component. In further embodiments, a second particulate component includes particles with d50 particle size measurement of about ⅓*d50 of the third component. In embodiments, the particulate component with the largest d50 value, e.g. the first particulate component, is included in an amount of 25 vol. % to 50 vol. % based on total volume of the composite particulate component. The next particulate component with the next largest d50 value is included in an amount of 20 vol. % to 40 vol. % and thereafter particulate component with the smallest d50 value is included in an amount of 10 vol. % to 20 vol. %. In embodiments, the composite particulate component includes more than three components where each successive particulate component includes particles with d50 particle size measurement of about ⅓*d50 of the previous component and in an amount of about 5 vol. % to 10 vol. %.

In embodiments, the polymeric additive, fine particulate component, and composite particulate component provide the lost-circulation composition with the capability of plugging large fracture widths while allowing full passage of the lost-circulation composition through downhole equipment without plugging the downhole equipment. The selection method disclosed herein for particle sizes of the fine particulate component and composite particulate component based on fracture width allows for tailoring the capability of the lost-circulation composition to plug and/or reduce fluid flow through a fracture while allowing full volume transport of the lost-circulation composition downhole equipment.

In embodiments the morphology of the particulate components present in the composite particulate component include flakes, sheets, particulates, and/or fibers. In embodiments the particulate components include folding and flexible materials. Folding and flexible materials enable the particulate components to be placed into a large fracture before unfolding when situated to block a greater area in the fracture. The folding and flexible material may have an aspect ratio in a range of 1000:1 to 100,000:1 where the aspect ratio is defined as: average length of the greatest dimension of the particulate component/average thickness of the particulate component. In embodiments, the particulate components are relatively to allow for folding and flexion. In embodiments, the particulate components may have a high degree of foldability defined as where the d90 particles may be manually folded at least twice without shear failure.

In embodiments, the composite particulate component includes elastomers i.e. materials which experience large reversible deformations under relatively low stress. Some examples of commercially available elastomers include natural rubber, ethylene/propylene (EPM) copolymers, ethylene/propylene/diene (EPDM) copolymers, styrene/butadiene copolymers, chlorinated polyethylene, and silicone rubber. In embodiments, the composite particulate component includes thermoplastic elastomers are elastomers having thermoplastic properties. That is, thermoplastic elastomers are optionally molded or otherwise shaped and reprocessed at temperatures above their melting or softening point. One example of a thermoplastic elastomer is styrene-butadiene-styrene (SBS) block copolymer. SBS block copolymers exhibit a two phase morphology including glassy polystyrene domains connected by rubbery butadiene segments. In embodiments, the composite particulate component includes thermoset elastomers which are elastomers having thermoset properties. That is, thermoset elastomers irreversibly solidify or "set" when heated, generally due to an irreversible crosslinking reaction. Two examples of thermoset elastomers are crosslinked ethylene-propylene monomer rubber (EPM) and crosslinked ethylene-propylene-diene 3 monomer rubber (EPDM). EPM materials are made by copolymerization of ethylene and propylene. EPM materials are typically cured with peroxides to give rise to crosslinking, and thereby induce thermoset properties. EPDM materials are linear interpolymers of ethylene, propylene, and a non-conjugated diene such as 1,4-hexadiene, dicyclopentadiene, or ethylidene norbornene. EPDM materials are typically vulcanized with sulfur to induce thermoset properties, although they also can be cured with peroxides. While EPM and EPDM thermoset materials are advantageous in that they have applicability in higher temperature applications, EPM and EPDM elastomers have relatively low green strength (at lower ethylene contents), relatively low oil resistance, and relatively low resistance to surface modification. In embodiments, the composite particulate component includes elastomers thermoplastic vulcanizates (TPV's) which include thermoplastic matrices, such as crystalline, through which thermoset elastomers are generally uniformly distributed. Some examples of thermoplastic vulcanizates include ethylene-propylene monomer rubber and ethylene-propylene-diene monomer rubber thermoset materials distributed in a crystalline polypropylene matrix. In further embodiments, the composite particulate component includes polyacrylonitrile, acrylonitrile/methyl acrylate copolymer, polypropylene, viscose, silicon carbide, fiberglass, cellulosic materials, hemicellulosic materials, inorganic minerals, acrylic polyester, polyamide, aromatic polyamide, polyolefin, polyurethane, polyvinyl chloride, polyvinyl alcohol fibers, lignocellulosic materials such as wood, straw, grain stalks, and/or paper.

In embodiments, the lost-circulation compositions disclosed herein are utilized to plug lost circulation zones within a subterranean formation where the lost circulation zones comprise fracture withs fracture widths from 1000 micron to 10000 micron. In embodiments, the lost-circulation compositions disclosed herein allow for full volume passage through 15,000 micron fracture widths, where the lost-circulation compositions is able to pass through a 15,000 micron slit as measured according to API RP 13B-1 and/or API RP 13B-2 and the lost-circulation compositions plugs or reduces flow through slits from 1000 micron to 10000 micron as measured according to API RP 13B-1 and/or API RP 13B-2.

The lost-circulation compositions disclosed herein may be prepared on-the-fly where a base fluid, such as a cement or spacer fluid, is pumped into the subterranean formation via a borehole or a wellbore and the remaining components of the lost-circulation composition, including the polymeric additive, the fine particulate component, and the composite particulate component containing size and shape selected materials are directly added thereto such as via a slip stream or other means, thereby forming the lost-circulation composition while the base fluid is pumped into the subterranean formation. Alternatively, or in addition to on-the-fly methods, the lost-circulation composition may be prepared in a batch manner whereby the components of the lost-circulation composition are mixed in a batch mixer or other suitable mixing unit and pumped into the subterranean formation via a borehole or a wellbore.

According to any of the embodiments, the lost-circulation compositions provide a desired fluid loss control. For example, a desired fluid loss control can be at least 70%, 80%, or 90% by volume of the base fluid is not lost through permeable areas of the subterranean formation. The particle size distribution of the plurality of particles of the lost-circulation compositions can be selected such that the lost-circulation materials provide the desired fluid loss control.

The concentration of the first, second, and third lost-circulation materials and any additional lost-circulation materials can also be selected such that the lost-circulation package provides the desired fluid loss control.

FIG. 1 illustrates an example technique for the introduction of a lost circulation composition 122 comprising the lost-circulation compositions disclosed herein into a lost circulation zone 125 while drilling equipment is present in a wellbore 116. Such an embodiment may be used, for example, when it is desired to reduce the loss of drilling fluid into a lost circulation zone 125. As such, the exemplary lost circulation treatment fluids which comprise the lost-circulation compositions disclosed herein may directly or indirectly affect one or more components or pieces of equipment associated with the preparation, delivery, recapture, recycling, reuse, and/or disposal of the disclosed lost-circulation compositions. For example, and with reference to FIG. 1, the lost circulation composition 122 may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As bit 114 rotates, it creates a wellbore 116 that penetrates various subterranean formations 118.

A pump 120 (e.g., a mud pump) circulates lost circulation composition 122 through a feed pipe 124 and to the kelly 110, which conveys the lost circulation composition 122 downhole through the interior of the drill string 108 and through one or more orifices in the drill bit 114. The lost circulation composition 122 may be introduced prior to, concurrently with, or subsequent to the introduction of a drilling fluid or other treatment fluid into the wellbore. The lost circulation composition 122 may then contact and flow into lost circulation zone 125. The lost circulation composition 122 that flows into circulation zone 125 may no longer be exposed to sufficient shear force to remain fluid and once static, lost circulation composition 122 may plug the lost circulation zone 125. The lost circulation composition 122 that does not contact a lost circulation zone 125 may then be circulated back to the surface, either with or without the presence of another fluid (e.g., drilling fluid) via an annulus 126 defined between the drill string 108 and the walls of the wellbore 116. At the surface, the recirculated or spent lost circulation composition 122 exits the annulus 126 and may be conveyed to one or more fluid processing unit(s) 128 via an interconnecting flow line 130. After passing through the fluid processing unit(s) 128, a "cleaned" lost circulation composition 122 may be deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

In embodiments, the lost circulation composition 122, which comprises the lost-circulation compositions disclosed herein, may be added to a mixing hopper 134 communicably coupled to or otherwise in fluid communication with the retention pit 132. The mixing hopper 134 may include, but is not limited to, mixers and related mixing equipment. In alternative embodiments, however, the lost circulation composition 122 may not be added to a mixing hopper. In at least one embodiment, for example, there could be more than one retention pit 132, such as multiple retention pits 132 in series. Moreover, the retention put 132 may be representative of one or more fluid storage facilities and/or units where the disclosed lost-circulation compositions may be stored, reconditioned, and/or regulated until desired for use, e.g., as lost circulation composition 122.

As mentioned above, the disclosed lost circulation composition 122 which comprises the lost-circulation compositions disclosed herein, may directly or indirectly affect the components and equipment of the drilling assembly 100. For example, the disclosed lost circulation composition 122 may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the exemplary lost circulation composition 122.

The lost circulation composition 122 may directly or indirectly affect the pump 120, which representatively includes any conduits, pipelines, trucks, tubulars, and/or pipes used to fluidically convey the lost circulation composition 122 downhole, any pumps, compressors, or motors (e.g., topside or downhole) used to drive the lost circulation composition 122 into motion, any valves or related joints used to regulate the pressure or flow rate of the lost circulation composition 122, and any sensors (i.e., pressure, temperature, flow rate, etc.), gauges, and/or combinations thereof, and the like. The disclosed lost circulation composition 122 may also directly or indirectly affect the mixing hopper 134 and the retention pit 132 and their assorted variations.

The disclosed lost circulation composition 122 may also directly or indirectly affect the various downhole equipment and tools that may come into contact with the lost circulation composition 122 such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed lost circulation composition 122 may also directly or indirectly affect any downhole heat exchangers, valves and corresponding actuation devices, tool seals, packers and other wellbore isolation devices or components, and the like associated with the wellbore 116. The disclosed lost-circulation compositions may also directly or indirectly affect the drill bit 114, which may include, but is not limited to, roller cone bits, PDC bits, natural diamond bits, any hole openers, reamers, coring bits, etc.

While not specifically illustrated herein, the disclosed lost circulation composition 122 may also directly or indirectly affect any transport or delivery equipment used to convey the lost circulation composition 122 to the drilling assembly 100 such as, for example, any transport vessels, conduits, pipelines, trucks, tubulars, and/or pipes used to fluidically move the lost circulation composition 122 from one location to another, any pumps, compressors, or motors used to drive the lost circulation composition 122 into motion, any valves or related joints used to regulate the pressure or flow rate of the lost circulation composition 122, and any sensors (i.e., pressure and temperature), gauges, and/or combinations thereof, and the like.

Figure 2:
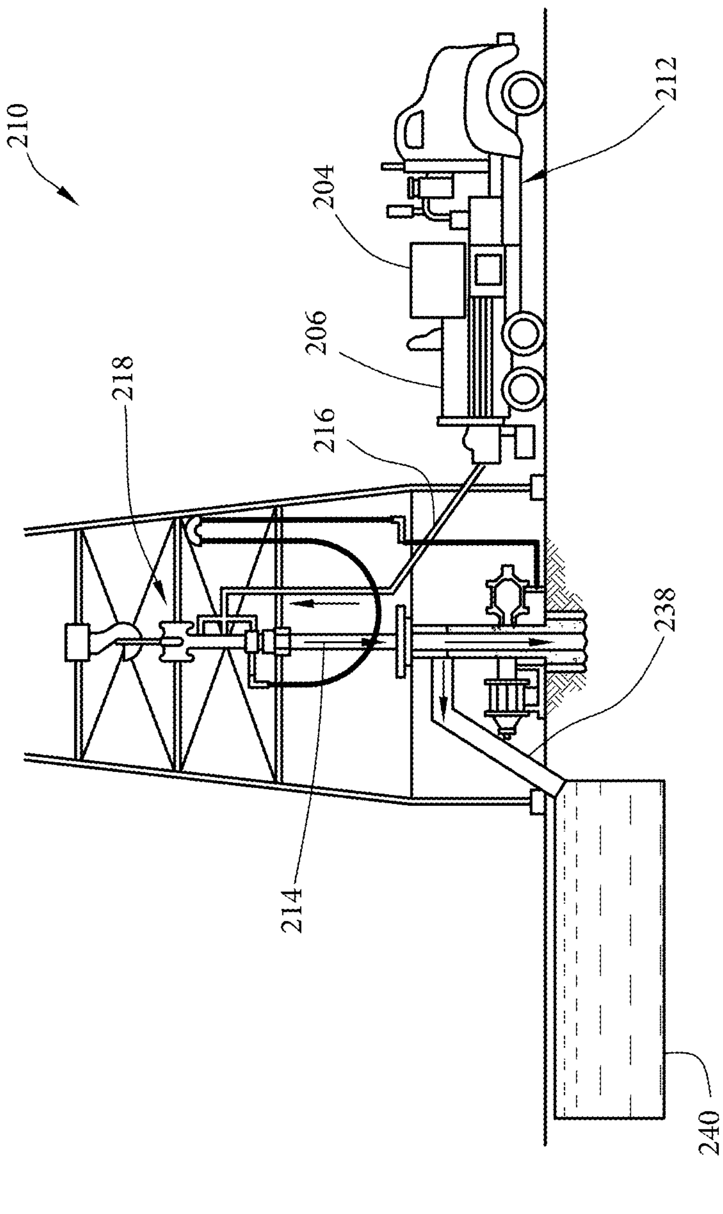
FIG. 2 illustrates surface equipment that may be used in the placement of a lost circulation compositions into a lost circulation zone in a wellbore in accordance with certain embodiments.
Figure 3:
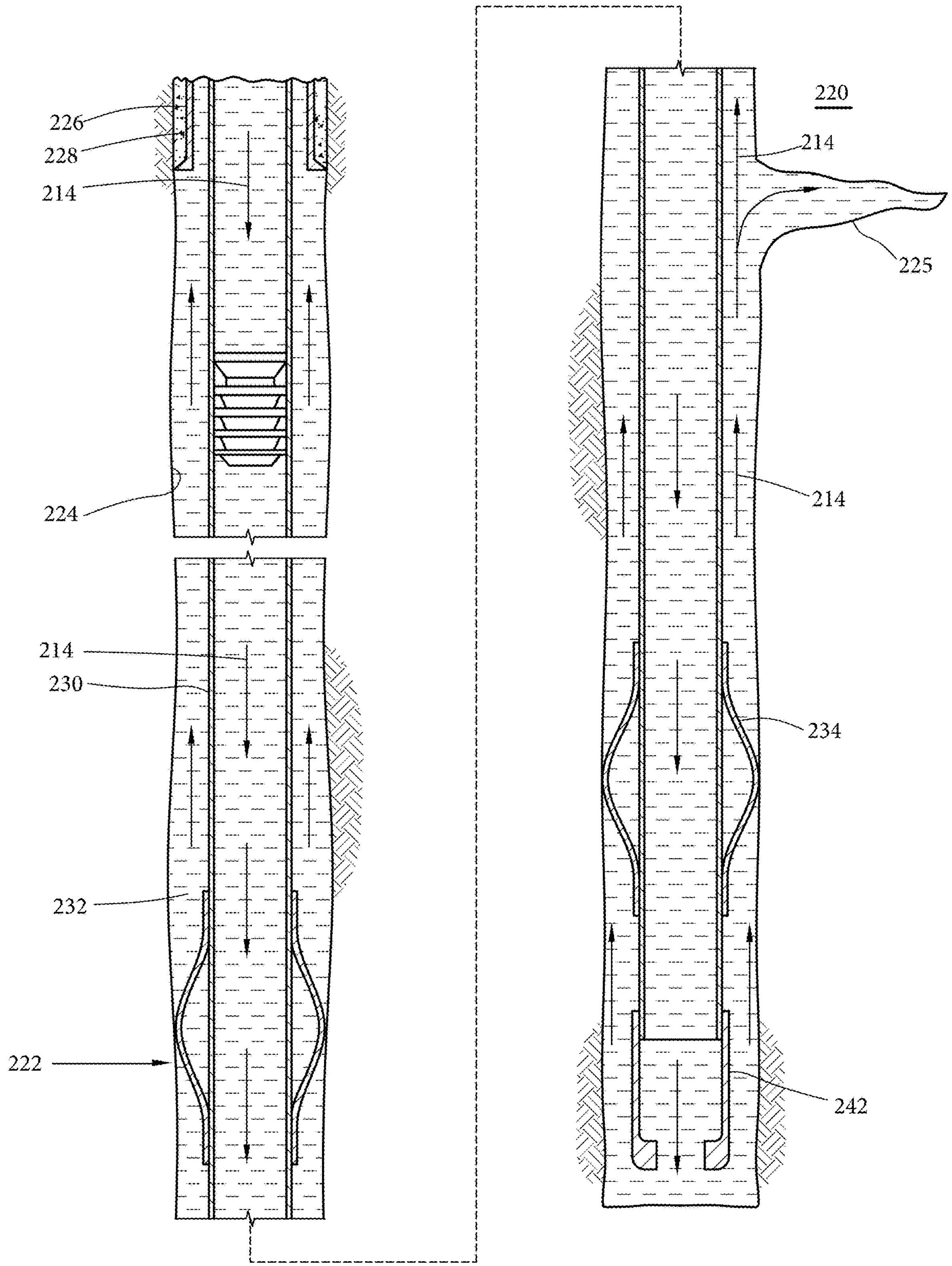
FIG. 3 illustrates the placement of a lost circulation compositions into a lost circulation zone in a wellbore in accordance with certain embodiments.

FIGS. 2 and 3 illustrate an example technique for placing a lost circulation composition 214 comprising the lost-circulation compositions disclosed herein into a lost circulation zone 225 while cementing equipment and casing are present in the wellbore 222. Such an embodiment may be used, for example, when it is desired to reduce the loss of displacement fluid into a lost circulation zone 225. FIG. 2 illustrates surface equipment 210 that may be used in placement of lost circulation composition 214 in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. Additionally, it should be noted that lost circulation composition 214 may be introduced prior to, concurrently with, or subsequent to the introduction of any other treatment fluid (e.g., a displacement fluid, competition fluid, etc.) into wellbore 222. As illustrated by FIG. 2, surface equipment 210 may include a cementing unit 212, which may include one or more cement trucks. Cementing unit 212 may include mixing equipment 204 and pumping equipment 206 as will be apparent to those of ordinary skill in the art. The cementing unit 212 may pump lost circulation composition 214 through a feed pipe 216 and to a cementing head 218 which conveys the lost circulation composition 214 downhole.

Turning now to FIG. 3, the lost circulation treatment fluid 214, comprising the lost-circulation compositions disclosed herein, may be placed into a subterranean formation 220 in accordance with example embodiments. As illustrated, wellbore 222 may be drilled into the subterranean formation 220. While wellbore 222 is shown extending generally vertically into the subterranean formation 220, the principles described herein are also applicable to wellbores that extend at an angle through the subterranean formation 220, such as horizontal and slanted wellbores. As illustrated, wellbore 222 comprises walls 224 with lost circulation zones 225. In the illustrated embodiment, a surface casing 226 has been inserted into wellbore 222. The surface casing 226 may be cemented to the walls 224 of the wellbore 222 by cement sheath 228. In the illustrated embodiment, one or more additional conduits (e.g., intermediate casing, production casing, liners, etc.), shown here as casing 230 may also be disposed in the wellbore 222. As illustrated, there is a wellbore annulus 232 formed between the casing 230 and the walls 224 of the wellbore 222 and/or the surface casing 226. One or more centralizers 234 may be attached to the casing 230, for example, to centralize the casing 230 in the wellbore 222 prior to and during the cementing operation.

With continued reference to FIG. 3, the lost circulation composition 214 may be pumped down the interior of the casing 230. The lost circulation composition 214 may be allowed to flow down the interior of the casing 230 through the casing shoe 242 at the bottom of the casing 230 and up around the casing 230 into the wellbore annulus 232. As the lost circulation composition 214 flows upward through the annulus 232, lost circulation composition 214 may contact lost circulation zones 225. If lost circulation composition 214 contacts a lost circulation zone 225, lost circulation composition 214 may flow into lost circulation zone 225 and plug lost circulation zone 225. Once plugged, lost circulation composition 214 may then seal lost circulation zone 225 and prevent the loss of any treatment fluids that subsequently flow adjacent to lost circulation zone 225. In embodiments where the lost circulation treatment fluid includes a cement slurry base fluid, lost circulation composition 214 may be allowed to harden and set in lost circulation zone 225, for example, to form a cement sheath that supports and positions the casing 230 in the wellbore 222. Other techniques may also be utilized for introduction of the lost circulation treatment fluid 214. By way of example, reverse circulation techniques may be used that include introducing the lost circulation composition 214 into the lost circulation zone 225 by way of the wellbore annulus 232 instead of through the casing 230.

Any of the lost circulation composition 214 that does not contact a lost circulation zone 225 may exit the wellbore annulus 232 via a flow line 238 and be deposited, for example, in one or more retention pits 240 (e.g., a mud pit), as shown on FIG. 2.

In primary cementing embodiments, for example, embodiments of the lost-circulation compositions may be introduced into a space between a wall of a wellbore and a conduit (e.g., pipe strings, liners) located in the wellbore, the wellbore penetrating the subterranean formation. The lost-circulation compositions may be allowed to set to form an annular sheath of hardened cement in the space between the wellbore wall and the conduit. Among other things, the set cement composition may form a barrier, preventing the migration of fluids in the wellbore. The set cement composition also may, for example, support the conduit in the wellbore.

In remedial cementing embodiments, a lost-circulation compositions may be used, for example, in squeeze-cementing operations or in the placement of cement plugs. By way of example, the set-delayed composition may be placed in a wellbore to plug an opening, such as a void or crack, in the formation, in a gravel pack, in the conduit, in the cement sheath, and/or a microannulus between the cement sheath and the conduit.

In embodiments, the lost-circulation compositions may be used for different subterranean operations. In embodiments, the lost-circulation compositions may be used for one or more subterranean operations at a specific worksite. As discussed above, the lost-circulation compositions may serve as a treatment fluid for these different subterranean operations. In embodiments, the lost-circulation compositions may be used as a lost circulation treatment fluid and when set as a cementing composition that may support and position a casing in a wellbore. In embodiments, the lost-circulation compositions may be reused or recirculated in the wellbore for the same or a different operation. The reusability of the lost-circulation compositions allows for the recycling of the lost-circulation compositions. Furthermore, this process reduces the amount of equipment and manpower needed between operations in regards to transitioning between operations, fluid handling, and fluid storage.

The exemplary lost-circulation compositions disclosed herein may directly or indirectly affect one or more components or pieces of equipment associated with the preparation, delivery, recapture, recycling, reuse, and/or disposal of the disclosed lost-circulation compositions. For example, the disclosed lost-circulation compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary lost-circulation compositions. The disclosed lost-circulation compositions may also directly or indirectly affect any transport or delivery equipment used to convey the lost-circulation compositions to a well site or downhole such as, for example, any transport vessels, conduits, pipelines, trucks, tubulars, and/or pipes used to compositionally move the lost-circulation compositions from one location to another, any pumps, compressors, or motors (e.g., topside or downhole) used to drive the lost-circulation compositions into motion, any valves or related joints used to regulate the pressure or flow rate of the lost-circulation compositions, and any sensors (i.e., pressure and temperature), gauges, and/or combinations thereof, and the like. The disclosed lost-circulation compositions may also directly or indirectly affect the various downhole equipment and tools that may come into contact with the lost-circulation compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Accordingly, the present disclosure may provide lost-circulation compositions comprising a carrier fluid, a polymeric additive, a fine particulate component, and a composite particulate component containing size and shape selected materials. The methods and compositions may include any of the various features disclosed herein, including one or more of the following statements.

Statement 1. A method of sealing a lost circulation zone comprising: circulating a lost circulation treatment composition to a subterranean formation comprising a lost circulation zone, wherein the lost circulation treatment composition comprises: a carrier fluid; a polymeric additive; a fine particulate component; and a composite particulate component containing size and shape selected materials; wherein the lost circulation treatment composition has the property of allowing full volume passage through a 15,000 micron fracture width as measured according to API RP 13B-1 and/or API RP 13B-2; flowing the lost circulation treatment composition into the lost circulation zone; and plugging the lost circulation zone using the lost circulation treatment composition.

Statement 2. The method of statement 1 wherein the carrier fluid comprises a cement slurry base fluid comprising a hydraulic cement and water.

Statement 3. The method of any of statements 1-2 wherein the carrier fluid comprises a spacer fluid.

Statement 4. The method of any of statements 1-3 wherein the polymeric additive comprises at least one polymer selected from the group consisting of polyacrylamide, acrylamide copolymer, acrylamide-co-t-butylacrylate copolymer, 2-acrylamido-2-methylpropane sulfonic acid/acrylamide copolymer, sulfonated styrene/maleic anhydride copolymer, vinylpyrrolidone/2-acrylamido-2-methylpropane sulfonic acid/acrylamide terpolymer, 2-acrylamido-2-methylpropane sulfonic acid/N—N-dimethylacrylamide/acrylamide terpolymer, polyketone, acrylamide/t-butyl acrylate copolymer, and combinations thereof.

Statement 5. The method of any of statements 1-4 wherein the fine particulate component comprises cellulose having a d10 value in the range of 10 to 50 microns, a d50 value in a range of 60 to 150 microns, and a d90 value in the range of 150 to 400 microns.

Statement 6. The method of any of statements 1-5 wherein the fine particulate component comprises calcium carbonate having a d10 value in the range of 10 to 50 microns, a d50 value in a range of 60 to 150 microns, and a d90 value in the range of 150 to 400 microns.

Statement 7. The method of any of statements 1-6 wherein the fine particulate component has a d90/d10 ratio of 3 to about 40.

Statement 8. The method of any of statements 1-7 wherein the composite particulate component comprises a first particulate component wherein the first particulate component has a d50 particle size of about ⅓ a fracture width within the lost circulation zone.

Statement 9. The method of any of statements 1-8 wherein the first particulate component is present in an amount of about 25 vol. % to about 50 vol. % of the composite particulate component.

Statement 10. The method of any of statements 1-9 wherein the composite particulate component further comprises a second particulate component having a d50 particle size of about ⅕ the d50 particle size of the first particulate component.

Statement 11. The method of any of statements 1-10 wherein the second particulate component is present in an amount of about 20 vol. % to about 40 vol. % of the composite particulate component.

Statement 12. The method of any of statements 1-11 wherein the composite particulate component further comprises a third particulate component having a d50 particle size of about ⅕ the d50 particle size of the second particulate component.

Statement 13. The method of any of statements 1-12 wherein the third particulate component is present in an amount of about 10 vol. % to about 20 vol. % of the composite particulate component.

Statement 14. The method of any of statements 1-13 wherein the lost circulation zone comprises a fracture having a fracture width from about 5000 microns to about 10,000 microns.

Statement 15. The method of any of statements 1-14 wherein the lost circulation treatment composition reduces volume lost to the lost circulation zone by at least 80 vol. %.

Statement 16. The method of any of statements 1-15 wherein the composite particulate component comprises foldable materials.

Statement 17. The method of any of statements 1-16 wherein the composite particulate component has the property of wherein particles with d90 particulate sizes may be manually folded at least twice without shear failure.

Statement 18. The method of any of statements 1-17 wherein the composite particulate component comprises at least one particulate selected from the group consisting natural rubber, ethylene/propylene (EPM) copolymers, ethylene/propylene/diene (EPDM) copolymers, styrene/butadiene copolymers, chlorinated polyethylene, silicone rubber, styrene-butadiene-styrene (SBS) block copolymer, cross-linked ethylene-propylene monomer rubber (EPM), cross-linked ethylene-propylene-diene monomer rubber (EPDM), ethylene-propylene monomer rubber, ethylene-propylene-diene monomer rubber thermoset materials distributed in a crystalline polypropylene matrix, polyacrylonitrile, acrylonitrile/methyl acrylate copolymer, polypropylene, viscose, silicon carbide, fiberglass, acrylic polyester, polyamide, aromatic polyamide, polyolefin, polyurethane, polyvinyl chloride, polyvinyl alcohol fibers, wood, straw, grain stalks, and paper, and combinations thereof.

Statement 19. A lost circulation treatment composition comprising: a carrier fluid; a polymeric additive; a fine particulate component; and a composite particulate component containing size and shape selected materials; wherein the cost circulation treatment composition has the property of allowing full volume passage through a 15,000 micron fracture width.

Statement 20. The composition of statement 19 wherein the composite particulate component comprises a first particulate component wherein the first particulate component has a d50 particle size of about ⅓ a fracture width of about 5000 microns to about 10,000 microns, a second particulate component having a d50 particle size of about ⅕ the d50 particle size of the first particulate component, a third particulate component having a d50 particle size of about ⅕ the d50 particle size of the second particulate component, wherein the first particulate component is present in an amount of about 25 vol. % to about 50 vol. % of the composite particulate component, wherein the second particulate component is present in an amount of about 20 vol. % to about 40 vol. % of the composite particulate component, and wherein the second particulate component is present in an amount of about 10 vol. % to about 20 vol. % of the composite particulate component.

To facilitate a better understanding of the present embodiments, the following examples of certain aspects of some embodiments are given. In no way should the following examples be read to limit, or define, the entire scope of the embodiments.

EXAMPLE

A sample lost circulation treatment fluid comprising a lost-circulation composition disclosed herein was prepared and tested. The fluid was tested according to API Recommended Practice for Field Testing Water Based Drilling Fluids, API RP 13B-1/ISO 10414-1 and API Recommended Practice for Field Testing Oil Based Drilling Fluids, API RP 13B-2. The fluid prepared included a spacer fluid and the lost-circulation composition included the following amounts of particles, fine=32% vol, medium=8% vol, large=32% vol, fiber=8% vol, flake=20% vol. It was observed that the fluid had full volume passage at 15 mm but plugged with 10 mm and 5 mm slots.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of sealing a lost circulation zone comprising:

introducing a lost circulation treatment composition to a subterranean formation comprising a lost circulation zone, wherein the lost circulation treatment composition comprises:
- a carrier fluid;
- a polymeric additive;
- a fine particulate component; and
- a composite particulate component containing size and shape selected materials comprising foldable sheets having an aspect ratio of 1000:1 to 100,000:1;

wherein the lost circulation treatment composition has the property of allowing full volume passage through a 15,000 micron fracture width as measured according to API RP 13B-1 and/or API RP 13B-2;

flowing the lost circulation treatment composition into the lost circulation zone; and plugging at least a portion of the lost circulation zone using the lost circulation treatment composition, wherein the composite particulate component comprises a first particulate component wherein the first particulate component has a d50 particle size of about ⅓ a fracture width of about 5000 microns to about 10,000 microns, a second particulate component having a d50 particle size of about ⅕ the d50 particle size of the first particulate component, a third particulate component having a d50 particle size of about ⅕ the d50 particle size of the second particulate component, wherein the first particulate component is present in an amount of about 25 vol. % to about 50 vol. % of the composite particulate component, wherein the second particulate component is present in an amount of about 20 vol. % to about 40 vol. % of the composite particulate component, and wherein the third particulate component is present in an amount of about 10 vol. % to about 20 vol. % of the composite particulate component.

2. The method of claim 1 wherein the carrier fluid comprises a cement slurry base fluid comprising a hydraulic cement and water.

3. The method of claim 1 wherein the carrier fluid comprises a spacer fluid.

4. The method of claim 1 wherein the polymeric additive comprises at least one polymer selected from the group consisting of polyacrylamide, acrylamide copolymer, acrylamide-co-t-butylacrylate copolymer, 2-acrylamido-2-methylpropane sulfonic acid/acrylamide copolymer, sulfonated styrene/maleic anhydride copolymer, vinylpyrrolidone/2-acrylamido-2-methylpropane sulfonic acid/acrylamide terpolymer, 2-acrylamido-2-methylpropane sulfonic acid/N—N-dimethylacrylamide/acrylamide terpolymer, polyketone, acrylamide/t-butyl acrylate copolymer, and combinations thereof.

5. The method of claim 1 wherein the fine particulate component comprises cellulose having a d10 value in the range of 10 to 50 microns, a d50 value in a range of 60 to 150 microns, and a d90 value in the range of 150 to 400 microns.

6. The method of claim 1 wherein the fine particulate component comprises calcium carbonate having a d10 value in the range of 10 to 50 microns, a d50 value in a range of 60 to 150 microns, and a d90 value in the range of 150 to 400 microns.

7. The method of claim 1 wherein the fine particulate component has a d90/d10 ratio of 3 to about 40.

8. The method of claim 1 wherein the lost circulation treatment composition reduces volume lost to the lost circulation zone by at least 80 vol. %.

9. The method of claim 1 wherein the composite particulate component has the property of wherein particles with d90 particulate sizes may be manually folded at least twice without shear failure.

10. The method of claim 1 wherein the composite particulate component comprises at least one particulate selected from the group consisting natural rubber, ethylene/propylene (EPM) copolymers, ethylene/propylene/diene (EPDM) copolymers, styrene/butadiene copolymers, chlorinated polyethylene, silicone rubber, styrene-butadiene-styrene (SBS) block copolymer, crosslinked ethylene-propylene monomer rubber (EPM), crosslinked ethylene-propylene-diene monomer rubber (EPDM), ethylene-propylene monomer rubber, ethylene-propylene-diene monomer rubber thermoset materials distributed in a crystalline polypropylene matrix, polyacrylonitrile, acrylonitrile/methyl acrylate copolymer, polypropylene, viscose, silicon carbide, fiberglass, acrylic polyester, polyamide, aromatic polyamide, polyolefin, polyurethane, polyvinyl chloride, polyvinyl alcohol fibers, wood, straw, grain stalks, and paper, and combinations thereof.

11. The method of claim 1 further comprising flowing the lost circulation treatment composition through an orifice in a downhole tool prior to introducing the lost circulation treatment into the lost circulation zone, wherein the lost circulation treatment fluid has full volume passage through the orifice.

12. A lost circulation treatment composition comprising:

a carrier fluid;

a polymeric additive;

a fine particulate component; and a composite particulate component containing size and shape selected materials;

wherein the lost circulation treatment composition has the property of allowing full volume passage through a 15,000 micron fracture width;

wherein the composite particulate component comprises a first particulate component wherein the first particulate component has a d50 particle size of about ⅓ a fracture width of about 5000 microns to about 10,000 microns, a second particulate component having a d50 particle size of about ⅕ the d50 particle size of the first particulate component, a third particulate component having a d50 particle size of about ⅕ the d50 particle size of the second particulate component, wherein the first particulate component is present in an amount of about 25 vol. % to about 50 vol. % of the composite particulate component, wherein the second particulate component is present in an amount of about 20 vol. % to about 40 vol. % of the composite particulate component, and wherein the third particulate component is present in an amount of about 10 vol. % to about 20 vol. % of the composite particulate component.

* * * * *